United States Patent [19]

Sherretts

[11] Patent Number: 4,650,198
[45] Date of Patent: Mar. 17, 1987

[54] MOLDABLE SKI-SLED

[76] Inventor: Jeffrey R. Sherretts, 28 Jackson St., Binghamton, N.Y. 13903

[21] Appl. No.: 734,132

[22] Filed: May 14, 1985

[51] Int. Cl.[4] .............................................. B62B 13/04
[52] U.S. Cl. .................................................. 280/12 K
[58] Field of Search .............. 280/12 F, 12 K, 12 KL, 280/18, 610, 821; 297/440

[56] References Cited

U.S. PATENT DOCUMENTS

| 3,190,668 | 6/1965 | Husak | 280/12 K |
| 3,325,179 | 6/1967 | Bissett | 280/12 K |
| 3,744,811 | 7/1973 | Johnston | 280/12 K |
| 3,778,077 | 12/1973 | Johnson | 280/12 K |
| 3,830,513 | 8/1974 | Hunt | 280/12 K |
| 3,862,765 | 1/1975 | Goheen | 280/821 |
| 4,030,648 | 6/1977 | Johnson et al. | 280/202 |
| 4,324,409 | 4/1982 | Larson et al. | 280/12 F |
| 4,349,208 | 9/1982 | Merrill | 280/12 K |
| 4,412,687 | 11/1983 | Andre | 280/610 |
| 4,440,408 | 4/1984 | Velman | 280/12 KL |
| 4,533,150 | 8/1985 | Hardy | 280/18 |

FOREIGN PATENT DOCUMENTS 3206975 2/1982 Fed. Rep. of Germany ... 280/12 K

Primary Examiner—John J. Love
Assistant Examiner—Richard M. Camby
Attorney, Agent, or Firm—Kenneth P. Johnson

[57] ABSTRACT

A single runner ski-sled for use by youngsters on snowy slopes and particularly adaptable to molded plastic construction. The ski-sled comprises a principal frame member to which the single runner is permanently attached and a removable seat member on the frame is supported by a disengageable strut member at the outboard ends. Structural elements utilize I and C cross-section for strength with minimal weight and incorporate integral, resilient fastening devices to facilitate quick and easy assembly and disassembly of the ski-sled components. The device can be compactly packaged or stored.

7 Claims, 3 Drawing Figures

MOLDABLE SKI-SLED

FIELD OF THE INVENTION

This invention relates generally to single runner ski-sleds and, more particularly, to the fabrication and structure of a ski-sled.

BACKGROUND OF THE INVENTION

Single runner ski-sleds are well-known wintertime amusement devices as evidenced by U.S. Pat. Nos. 4,349,208; 3,830,513; 3,778,077; 3,744,811 and 3,325,179, for example. These ski-sleds fundamentally provide a single, ski-type runner to which is secured near the center of the runner a pedestal assembly supporting a seat for the rider. Sled guidance is accomplished by shifting the rider's weight to cause the ski to turn.

The known ski-sleds are characterized by excessive weight, or complex or non-collapsible structure that present difficulties for storing or for young children to manipulate or assemble. A further disadvantage is frequently an unwieldy and large bulk that adds expense or inconvenience to commercial shipments or storage. Although some of the known ski-sleds can be folded or collapsed, they still retain a cumbersome, awkward mass to carry or store. Construction materials of the prior art sleds have also been of relatively dense, heavy materials to provide adequate strength as cross-sectional areas of support members have been decreased. Although some ski-sleds have been molded of lighter weight plastics, collapse or disassembly of these devices is not possible, so that an ungainly bulk remains.

Objects and Summary of the Invention

It is accordingly a primary object of this invention to provide a ski-sled having components that can be easily assembled for use and disassembled for storage.

Another important object of this invention is to provide a single runner sled constructed of components that can be inexpensively molded of plastics, be hand-assembled and provide a strong, sound appliance giving reliable, durable service.

A further object of this invention is to provide a single runner sled of molded components having integral fastening devices for assembly.

Yet another object of this invention is to provide a single runner sled having a principal frame member with integral runner and attachable seat member and strut element therefor.

The foregoing objects are attained in accordance with the invention by providing a principal frame member having an open central area and a runner fixedly attached to one portion of the perimetral surface of the frame member. At a second perimetral portion of the frame member, a seat member is removably attached and supported at its outboard ends by a removable V-shaped strut member that locks to both said frame and seat members.

Several advantages flow from the invention. All components are moldable, preferably from semi-rigid light weight plastics. Load-bearing members are of webbed, selectively reinforced construction having non-uniform cross-section to minimize weight. Easy assembly and disassembly result from the molded parts which include integral fastening elements such as hooks and clips. Handgrips and a comfortable supporting seat are also provided. The sled can be readily packed for compact storage or shipment. This invention provides a durable, reliable, lightweight entertainment device for the winter season.

Additional objects, features and advantages of the invention will become apparent from the following, more particular description of a preferred embodiment of the invention with reference to the accompanying drawing.

DESCRIPTION OF THE PREFERRED EMBODIMENT

Figure 1:
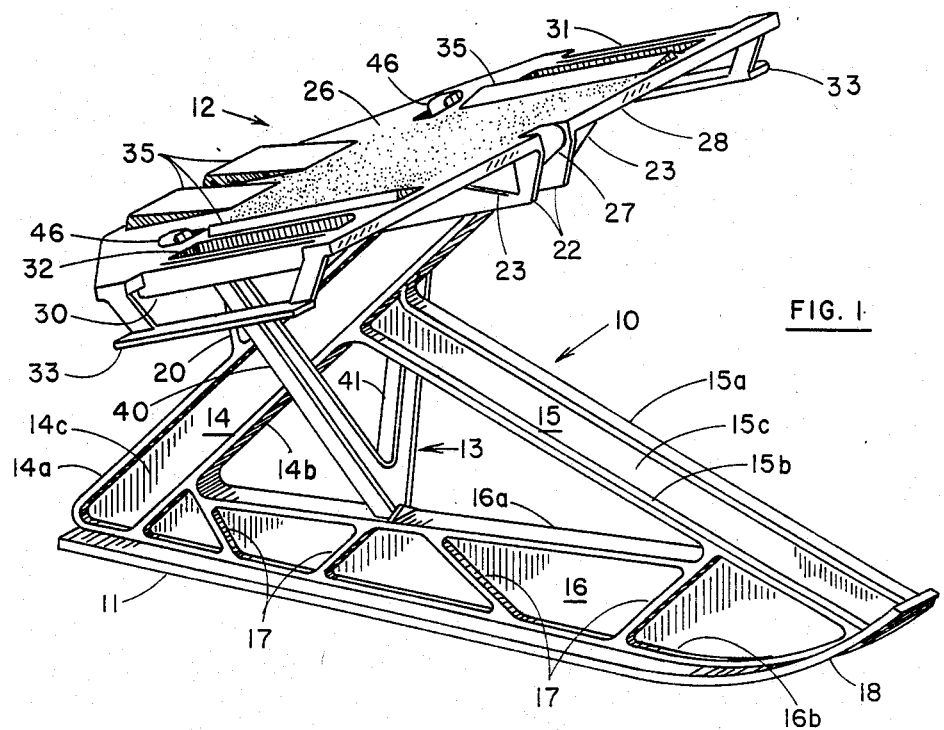
FIG. 1 is a perspective view of a single runner ski-sled constructed in accordance with the principles of the invention.
Figure 2:
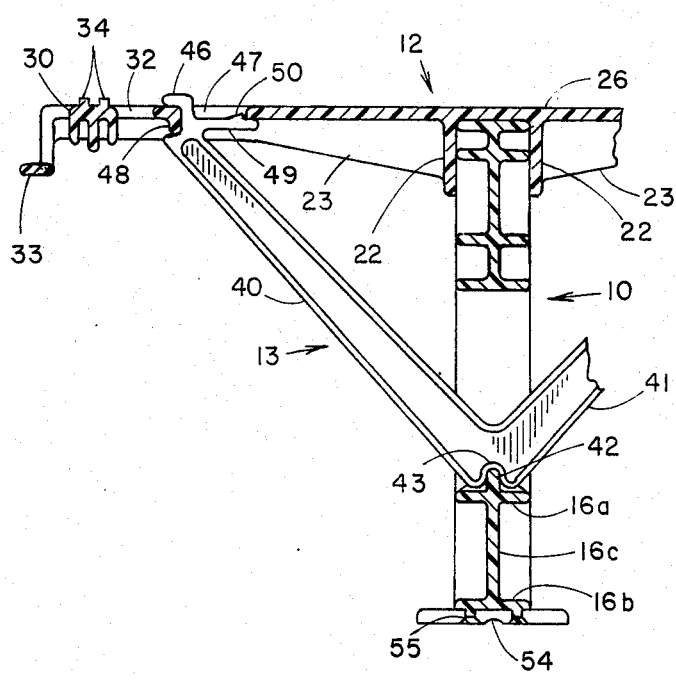
FIG. 2 is a cross-sectional view, showing the principal support member with seat and strut members attached thereto.

Referring to the figures, the ski-sled of the invention comprises generally a principal or main frame member 10 of polygonal configuration, having runner 11 attached, and a substantially planar seat member 12 with the latter being supported at its outboard ends by the arms of a V-shaped strut member 13. Principal frame member 10 is of generally triangular configuration formed of segments or sections 14, 15 and 16 and having an open central area. Each segment has an I or C cross-section comprising pairs of substantially parallel, respective flanges 14a and 14b, and 15a and 15b, 16a and 16b with each pair being integrally joined with a respective web 14c, 15c and 16c. An I-shaped cross-section has been illustrated. Segment 16, to which runner 11 is secured, has gradually diverging flanges being widest at the front or leading end, and diagonal reinforcing ribs 17, integral with web 16c along its length to provide supplemental strength and rigidity for the underlying runner. The forward juncture of segments 15 and 16 is curved upward at 18 to provide a leading end for runner 11. Segment 14 joins the trailing end of segment 16 and extends upwardly joining segment 15 near the apex of frame member 10, and extends beyond segment 15 to provide a substantially horizontal seat support flange 19 above the apex. Flange 20 on segment 14 is joined to flange 19 at its end and by web 21, and provides a support surface for seat member 12 sloping downward slightly towards the rear.

Figure 3:
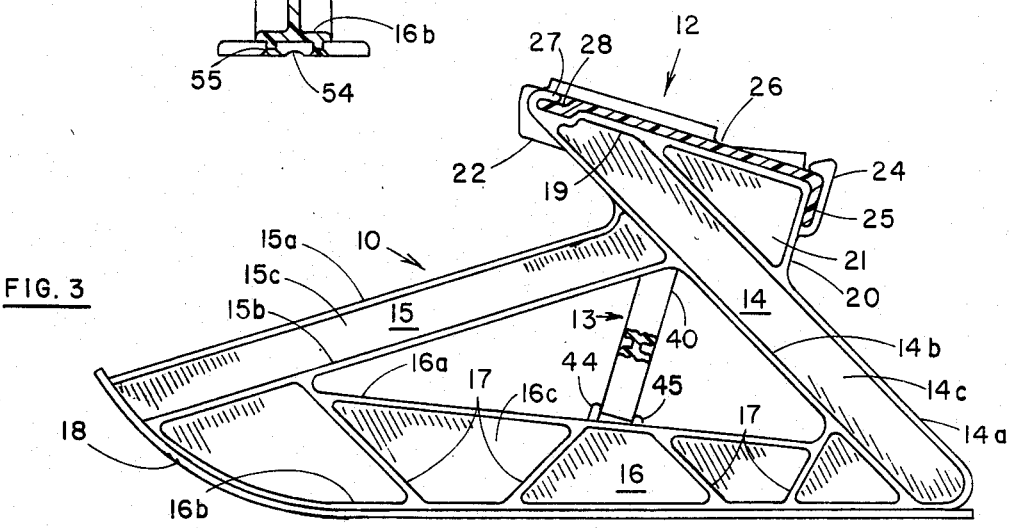
FIG. 3 is a side elevation view, showing the seat member in cross-section.

At the lateral mid-point of seat member 12, a pair of depending flanges 22 form a channel to accomodate flange 19 therebetween. Pairs of gussets 23 extend between flanges 22 and the underside of horizontal seat member 12 to stabilize flanges 22. The rear surface of vertical flange 20 carries a flexible latch or clip 24 integrally molded with flange 20 that provides a slot to accept and lock in flange 25 along the rear edge of seat member 12. Clip 24 snaps over surface 26 of the seat member to retain the seat member in position. Flange 19 also carries an integral flexible hook 27 under which a recessed portion 28 of seat surface 26 can lock. Seat member 12 can be removed from flange 19 by bending latch 24, clockwise in FIG. 3, away from seat flange 25, lifting rear of seat member 12 to pull flange 25 clear of the clip and withdrawing recessed portion 28 from under hook 27.

Seat member 12 is molded with integral handgrips 30, 31 across a respective opening 32 in each outboard end of the seat. The handgrips are protected by depending guards 33 to prevent possible injury to the hands should the rider tilt severely to one side. Striations 34 are molded into the top side and underside of the handgrips to facilitate a firm grasp. Seat surface 26 has sloped side and rear body supports 35 to provide seat contouring for comfort. The rear corners of seat member 12 may be eliminated, as illustrated if desired. Seat surface 26 can be textured by mold etching to prevent sliding by the rider.

Seat member 12 is braced at its outboard ends by a respective arm 40, 41 of strut member 13 that is retained on a locator rib 42 integral with flange 16a. Strut recess 43 accomodates the rib and has end flanges 44, 45 to restrain strut motion longitudinally of the rib. Each free end of arms 40, 41 has a C-shaped hook 46 that passes through an opening 47 and engages the seat member and depending lip 48. An integral flexible flange 49, having a detent 50 thereon, prevents the arm end from passing through opening 47, while detent 50 prevents lateral motion of the arm toward the seat center. For disassembly, flanges 49 are depressed sufficiently that detents 50 clear the seat member and the C-shaped hooks 46 and arm ends can be withdrawn from the seat surface 26 and lips 48. Thereafter, the seat member can be detached by retracting latch 24 and upwardly rotating the seat member as described above.

Runner 11 is preferably permanently secured to flange 16b of frame member 10. This can be readily accomplished by first forming the runner in the ski-shape shown with a curved, tapered toe, and having the desired cross-sectional configuration, such as the center groove 54 for stability and guidance. Tapered or countersunk holes 55 are provided in the runner at suitable intervals along the extent of the runner coincident with the edges of flange 16b. The runner is preferably molded of a slippery plastic material then placed in a mold for frame member 10 when the latter is to be formed. With this process, the material forming the frame member flows into holes 55 to form a locking unitary structure.

The ski-sled described above is preferably molded of durable plastics. For example, runner 11, when formed of polyethylene, has a surface with low coefficient of friction on snow but is strong and durable so that it can slide easily over a snow-covered surface. Frame member 10, seat member 12 and strut member 13 are preferably molded of polypropylene which provides a durable, flexible element with attractive surface finish. These materials can also be molded in a wide range of colors.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A ski-sled comprising:
    frame means having a plurality of integrally molded segments to form a unitary structure with one of said segments being substantially linear and having an arcuate end portion and a second of said segments having an integral support surface opposite said one segment of said frame means;
    runner means attached to said one segment;
    seat means releasably attached to said support surface, said seat means being substantially planar and having integral channel means to accommodate said support surface therein; and
    strut means extending from said one segment to releasably attach to each outboard end of said seat means as supplemental support therefor, the ends of said strut means being formed in C-shape and urgeable toward each other to disengage said seat means.

2. The device as described in claim 1 wherein said frame means comprises at least three segments and forms a substantially triangular structure having an open central area.

3. The device as described in claim 1 wherein said frame means has integral resilient clip means to releasably secure said seat means to said frame means.

4. The device as described in claim 1 wherein said strut ends engage said seat means through openings therein and said strut means have a recess to removably lock onto said one segment.

5. The device as described in claim 4 wherein said frame means, seat means, strut means and runner means are molded from a polymeric material.

6. The device described in claim 1 wherein each said segment comprises a pair of flanges integrally interconnected by a web and at least one of said segments includes ribs integrally molded with said flanges and said web.

7. The device as described in claim 1 wherein said seat means is molded and has a pair of openings each with a handgrip thereacross integral with said seat means and further includes a handgrip adjacent each said handgrip and integrally molded with said seat means.

* * * * *